(12) United States Patent
Kim et al.

(10) Patent No.: US 11,870,109 B2
(45) Date of Patent: Jan. 9, 2024

(54) GASKET ASSEMBLY AND FUEL CELL HUMIDIFIER INCLUDING SAME

(71) Applicant: KOLON INDUSTRIES, INC., Seoul (KR)

(72) Inventors: Do Woo Kim, Seoul (KR); Woong Jeon Ahn, Seoul (KR); Jung Kun Her, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 152 days.

(21) Appl. No.: 17/669,643

(22) Filed: Feb. 11, 2022

(65) Prior Publication Data

US 2022/0181649 A1 Jun. 9, 2022

Related U.S. Application Data

(63) Continuation of application No. PCT/KR2021/006260, filed on May 20, 2021.

(30) Foreign Application Priority Data

May 22, 2020 (KR) .................. 10-2020-0061427

(51) Int. Cl.
*H01M 8/0271* (2016.01)
*H01M 8/04119* (2016.01)
(Continued)

(52) U.S. Cl.
CPC ............. *H01M 8/0271* (2013.01); *F24F 3/14* (2013.01); *F24F 6/00* (2013.01); *H01M 8/04126* (2013.01); *B01D 2313/041* (2022.08)

(58) Field of Classification Search
CPC .......... H01M 8/0271; H01M 8/04126; H01M 8/04119; H01M 8/04149; B01D 2313/041;
(Continued)

(56) References Cited

U.S. PATENT DOCUMENTS 9,188,351 B1 * 11/2015 Kipnis .................... A47J 27/04
9,247,843 B1 * 2/2016 Kipnis .................... A47J 27/04
(Continued)

FOREIGN PATENT DOCUMENTS

CN 208849007 U * 5/2019 ............ Y02E 60/50
CN 113889647 A * 1/2022 ............ Y02E 60/50
(Continued)

OTHER PUBLICATIONS

KR Office Action, dated Sep. 14, 2022.
(Continued)

*Primary Examiner* — Kaity V Chandler
(74) *Attorney, Agent, or Firm* — Harvest IP Law, LLP

(57) ABSTRACT

The present disclosure relates to a gasket assembly that can be manufactured with improved productivity and can dramatically reduce maintenance costs, and a fuel cell humidifier including the same. A gasket assembly according to an embodiment of the present disclosure is provided for a fuel cell humidifier including a mid-case, a cap fastened to the mid-case, and at least one cartridge disposed in the mid-case and accommodating a plurality of hollow fiber membranes.

20 Claims, 9 Drawing Sheets

(51) Int. Cl.
*F24F 6/00* (2006.01)
*F24F 3/14* (2006.01)

(58) Field of Classification Search
CPC ....... B01D 63/043; B01D 63/02; Y02E 60/50; F16J 15/104; F16J 15/121; F16J 15/10; F24F 2003/1435; F24F 3/147; F24F 13/28; F24F 2006/006; F24F 3/14; F24F 12/006; F24F 5/0035; F24F 8/28; F24F 11/64; F24F 6/00; F24F 8/10; F24F 3/1417; F24F 2006/146; F24F 3/1411; F24F 6/14; F24F 8/22; F24F 11/46; F24F 12/001; F24F 2110/10; F24F 11/61; F24F 2006/008; F24F 2012/008; F24F 6/04; F24F 8/133; F24F 8/24; F24F 11/79; F24F 12/00; F24F 8/108; F24F 8/192; F24F 9/00; F24F 11/62; F24F 11/74; F24F 11/80; F24F 6/12; F24F 11/65; F24F 11/70; F24F 11/88; F24F 11/89; F24F 13/222; F24F 13/24; F24F 2003/144; F24F 2110/20; F24F 5/0007; F24F 6/043; F24F 8/26; F24F 8/30; F24F 1/0087; F24F 11/30; F24F 11/58; F24F 2013/247; F24F 3/16; F24F 6/02; F24F 7/007; F24F 8/158; F24F 8/20; F24F 1/0007; F24F 1/005; F24F 1/0059; F24F 1/0071; F24F 11/52; F24F 11/56
See application file for complete search history.

(56) References Cited

U.S. PATENT DOCUMENTS

| | | | |
|---|---|---|---|
| 2010/0193975 A1 | 8/2010 | Kammann | |
| 2014/0106245 A1* | 4/2014 | Harenbrock | H01M 8/04149 429/414 |
| 2014/0291874 A1 | 10/2014 | Kim | |
| 2015/0162627 A1* | 6/2015 | Fasold | H01M 8/04149 261/101 |
| 2015/0180060 A1* | 6/2015 | Purmann | H01M 8/04141 429/413 |
| 2015/0270561 A1* | 9/2015 | Harenbrock | H01M 8/04149 261/104 |
| 2015/0367279 A1 | 12/2015 | Kim | |
| 2020/0161678 A1* | 5/2020 | Bauer | B01D 63/085 |

FOREIGN PATENT DOCUMENTS

| | | | | |
|---|---|---|---|---|
| DE | 3032417 A1 | 8/1980 | | |
| JP | 2005-156062 A | 6/2005 | | |
| JP | 2012134067 A | 7/2012 | | |
| JP | 5135844 B2 | 2/2013 | | |
| JP | 2014-117667 A | 6/2014 | | |
| JP | 2014-522556 A | 9/2014 | | |
| JP | 5825032 B2 | 12/2015 | | |
| JP | 2020512664 A | 4/2020 | | |
| JP | 2021-508917 A | 3/2021 | | |
| JP | 2022-528103 A | 6/2022 | | |
| JP | 2022-529365 A | 6/2022 | | |
| JP | 2022-552509 A | 12/2022 | | |
| KR | 1020090013304 A | 2/2009 | | |
| KR | 1020090057773 A | 6/2009 | | |
| KR | 1020090128005 A | 12/2009 | | |
| KR | 1020100108092 A | 10/2010 | | |
| KR | 1020100131631 A | 12/2010 | | |
| KR | 1020110001022 A | 1/2011 | | |
| KR | 1020110006122 A | 1/2011 | | |
| KR | 1020110006128 A | 1/2011 | | |
| KR | 1020110021217 A | 3/2011 | | |
| KR | 1020110026696 A | 3/2011 | | |
| KR | 1020110063366 A | 6/2011 | | |
| KR | 2013-0034404 A | 4/2013 | | |
| KR | 101251256 B1 | * | 4/2013 | ................ F24F 6/00 |
| KR | 1020130065033 A | 6/2013 | | |
| KR | 2014038223 A | * | 3/2014 | ................ F24F 3/14 |
| KR | 101393558 B1 | 5/2014 | | |
| KR | 101697998 B1 | 1/2017 | | |
| KR | 20190035002 A | * | 4/2019 | .......... F24F 2003/14 |
| KR | 1020190081736 A | 7/2019 | | |
| KR | 1020190138528 A | 12/2019 | | |
| KR | 20210011204 A | * | 2/2021 | ................ F24F 6/04 |
| KR | 20210020311 A | * | 2/2021 | ............. Y02E 60/50 |
| KR | 20210067367 A | * | 6/2021 | ................ F24F 6/00 |
| WO | WO-2009089615 A1 | * | 7/2009 | .......... B01D 29/031 |
| WO | 2020-213990 A1 | 10/2020 | | |
| WO | 2020-262911 A1 | 12/2020 | | |

OTHER PUBLICATIONS

International Search Report dated Aug. 26, 2021.
Extended European Search Report dated Jul. 31, 2023.
JP 1st Office Action dated Oct. 3, 2023.

* cited by examiner

GASKET ASSEMBLY AND FUEL CELL HUMIDIFIER INCLUDING SAME

CROSS REFERENCE TO RELATED APPLICATIONS

This application is a continuation application of International Application No. PCT/KR2021/006260 filed on May 20, 2021, which claims priority from Korea Patent Application No. 10-2020-0061427 filed on May 22, 2020.

BACKGROUND OF THE DISCLOSURE

Field of the Disclosure

The present disclosure relates to a gasket assembly and a fuel cell humidifier including the same, and more particularly, to a gasket assembly that can be manufactured with improved productivity and can dramatically reduce maintenance costs, and a fuel cell humidifier including the same.

Related Art

A fuel cell is a power generation type cell that produces electricity by combining hydrogen and oxygen. Unlike general chemical cells such as dry cells and storage batteries, fuel cells can continuously produce electricity as long as hydrogen and oxygen are supplied, and there is no heat loss, so the efficiency is about twice that of an internal combustion engine.

In addition, since chemical energy generated by the combination of hydrogen and oxygen is directly converted into electrical energy, the emission of pollutants is small. Accordingly, the fuel cell has the advantage of being environmentally friendly and reducing concerns about resource depletion due to increased energy consumption.

These fuel cells are largely based on the type of electrolyte used: a polymer electrolyte membrane fuel cell (PEMFC), a phosphoric acid fuel cell (PAFC), a molten carbonate fuel cell (MCFC), a solid oxide fuel cell (SOFC), an alkaline fuel cell (AFC), or the like.

Each of these fuel cells operates on the same principle, but the type of fuels used, operating temperatures, catalysts, electrolytes, or the like are different from each other. Among them, the polymer electrolyte fuel cell (PEMFC) can be operated at a low temperature compared to other fuel cells and can be miniaturized due to a high output density, and thus, the polymer electrolyte fuel cell (PEMFC) is known to be the most promising not only in small-scale stationary power generation equipment but also in transportation systems.

One of the most important factors in improving performance of the polymer electrolyte fuel cell (PEMFC) is to maintain a moisture content by supplying more than a certain amount of moisture to a polymer electrolyte membrane or a proton exchange membrane (PEM) of a membrane-electrode assembly (MEA). This is because when the polymer electrolyte membrane is dried, the power generation efficiency is rapidly reduced.

As a method of humidifying the polymer electrolyte membrane, there are 1) a bubbler humidification method of supplying moisture by causing a target gas to pass through a diffuser after filling a pressure-resistant container with water, 2) a direct injection method of calculating an amount of supplied moisture required for a fuel cell reaction and supplying moisture directly to a gas flow pipe through a solenoid valve, and 3) a humidification membrane method of supplying moisture to a fluidized bed of gas using a polymer membrane.

Among them, in the membrane humidification method, water vapor is supplied to the air supplied to the polymer electrolyte membrane using a membrane that selectively transmits only water vapor contained in an off-gas, and thus, in the membrane humidification method of humidifying the polymer electrolyte membrane, it is possible to reduce weight and a size of the humidifier.

When the selective permeable membranes used in the membrane humidification method form a module, a hollow fiber membrane having a large permeation area per unit volume is preferable. That is, when a humidifier is manufactured using the hollow fiber membrane, high integration of the hollow fiber membrane with a large contact surface area is possible. Accordingly, the fuel cell can be sufficiently humidified even with a small capacity, low-cost materials can be used, and the moisture and heat contained in the off-gas discharged at high temperature from the fuel cell can be collected and reused in the humidifier.

FIG. 1 is an exploded perspective view illustrating a fuel cell humidifier according to the related art. As illustrated in FIG. 1, a fuel cell humidifier 100 of the related art is a humidification module 110 includes a humidifying module 110 in which moisture exchange occurs between air supplied from the outside and an off-gas discharged from the fuel cell stack (not illustrated), and caps 120 coupled to both ends of the humidifying module 110.

One of the caps 120 supplies the air supplied from the outside to the humidification module 110, and the other supplies air humidified by the humidification module 110 to the fuel cell stack.

The humidification module 110 includes a mid-case 111 having an off-gas inlet 111a and an off-gas outlet 111b and a plurality of hollow fiber membranes 112 within the mid-case 111. Both ends of the bundle of hollow fiber membranes 112 are fixed to a potting portion 113. The potting portion 113 is generally formed by curing a liquid polymer such as a liquid polyurethane resin through a casting method.

Air supplied from the outside flows along the hollows of the hollow fiber membranes 112. The off-gas introduced into the mid-case 111 through the off-gas inlet 111a is discharged from the mid-case 111 through the off-gas outlet 111b after coming into contact with outer surfaces of the hollow fiber membranes 112. When the off-gas comes into contact with the outer surfaces of the hollow fiber membranes 112, moisture contained in the off-gas penetrates the hollow fiber membranes 112, and thus, humidifies air flowing along the hollows of the hollow fiber membranes 112.

The inner spaces of the caps 120 are only in fluid communication with the hollows of the hollow fiber membranes 112, and should be completely blocked from the inner space of the mid-case 111. Otherwise, air leakage occurs due to a pressure difference, and thus, an amount of the humidified air supplied to the fuel cell stack is reduced and the power generation efficiency of the fuel cell is reduced.

In general, as illustrated in FIG. 1, the potting portion 113 to which ends of the plurality of hollow fiber membranes 112 are fixed, and a resin layer 114 between the potting portion 113 and the mid-case 111 block the inner spaces of the caps 120 and the inner space of the mid-case 111 are blocked. Similar to the potting portion 113, the resin layer 114 is generally formed by curing a liquid polymer such as a liquid polyurethane resin through a casting method.

However, since a casting process for forming the resin layer 114 requires a relatively long process time, productivity of the humidifier 100 is reduced.

In addition, since the resin layer 114 is adhered to an inner wall of the mid-case 111 as well as the potting portion 113, when a problem occurs in the hollow fiber membrane 112, the entire humidification module 110 should be replaced, and thus, maintenance costs largely increase.

Moreover, the repeated operation of the fuel cell is highly likely to cause a gap between the resin layer 114 and the mid-case 111. That is, as the operation and stop of the fuel cell are repeated, expansion and contraction of the resin layer 114 occur alternately, and there is a high probability that the resin layer 114 is separated from the mid-case 111 due to a difference in coefficients of thermal expansion between the mid-case 111 and the resin layer 114. As described above, when the gap is generated between the resin layer 114 and the mid-case 111, air leakage occurs due to the pressure difference, and thus, the amount of humidified air supplied to the fuel cell stack is reduced, and the power generation efficiency of the fuel cell is reduced.

In order to prevent the air leakage due to the occurrence of the gap between the resin layer 114 and the mid-case 111, it may be considered to perform an additional process such as applying a sealant between the resin layer 114 and the mid-case 111 and/or mounting an outer gasket assembly therebetween. However, the additional process itself also requires additional process time, and thus, the productivity of the humidifier 100 is reduced.

SUMMARY

The present disclosure provides a gasket assembly that can prevents problems due to the limitations and disadvantages of the related art as described above, can be manufactured with improved productivity, and can dramatically reduce maintenance costs, and a fuel cell humidifier including the same.

In addition to the above-mentioned aspects of present disclosure, other features and advantages of present disclosure will be described below or will be clearly understood by those of ordinary skill in the art to which present disclosure belongs from such description.

A gasket assembly according to one embodiment of the present disclosure is provided for a fuel cell humidifier including a mid-case, a cap fastened to the mid-case, and at least one cartridge disposed in the mid-case and accommodating a plurality of hollow fiber membranes. The gasket assembly includes: a packing portion including a body member having a hole into which an end portion of the cartridge is inserted and a protruding member formed at one end of the body member and in contact with the end portion of the cartridge inserted into the hole to prevent a fluid in the mid-case from flowing to the cap side; an edge portion formed at the other end of the body member and formed in a space formed by the groove formed in the end portion of the mid-case and the end portion of the cap; and a sealing portion formed to be in contact with the cartridge and the packing portion to prevent the fluid in the mid-case from flowing to the cap side.

In the gasket assembly according to one embodiment of the present disclosure, the body member may include a lower body member formed to protrude the mid-case side and an upper body member formed in a flat surface shape toward the cap side.

In the gasket assembly according to one embodiment of the present disclosure, the sealing portion is formed to be in contact with the end portion of the cartridge and the lower body member at the same time.

In the gasket assembly according to one embodiment of the present disclosure, the sealing portion may be formed to be in contact with the end portion of the cartridge and the upper body member at the same time.

In the gasket assembly according to one embodiment of the present disclosure, the sealing portion may be formed to be in contact with the end portion of the cartridge and the protruding member at the same time.

In the gasket assembly according to one embodiment of the present disclosure, the sealing portion may be formed to be in contact with at least one of the lower body member, the upper body member, and the protruding member, and the end portion of the cartridge at the same time.

In the gasket assembly according to one embodiment of the present disclosure, the body member may include two or more holes into which two or more cartridges are inserted, two or more protruding members may be provided and formed to be in contact with end portions of the two or more cartridges, and two or more sealing portions may be provided and formed to be in contact with each of the two or more cartridges and the packing portion.

In the gasket assembly according to one embodiment of the present disclosure, the protruding member may be in contact with the end portion of the cartridge while pressing the end portion of the cartridge by an elastic force to airtightly seal a space on the mid-case side and a space on the cap side.

In the gasket assembly according to one embodiment of the present disclosure, the edge portion may include edge wings protruding in both directions, and the edge wing may be disposed to fill a groove formed at an end portion of the mid-case and seals an inside and an outside of the mid-case, the mid-case, and the cap.

In the gasket assembly according to one embodiment of the present disclosure, each of the packing portion and the edge portion may have a first hardness of 20 to 70 Shore A, and a reinforcing member inserted into at least a portion of the packing portion and at least a portion of the edge portion and having a second hardness higher than the first hardness may be further provided.

A fuel cell humidifier according to one embodiment of the present disclosure includes a mid-case; a cap fastened to the mid-case; at least one cartridge disposed in the mid-case and accommodating a plurality of hollow first membranes; and a gasket assembly airtightly coupled to at least one end of a humidification module through mechanical assembly so that the cap is in fluid communication with only the hollow fiber membranes. The gasket assembly includes a packing portion including a body member having a hole into which an end portion of the cartridge is inserted and a protruding member formed at one end of the body member and in contact with the end portion of the cartridge inserted into the hole to prevent a fluid in the mid-case from flowing to the cap side, an edge portion formed at the other end of the body member and formed in a space formed by the groove formed in the end portion of the mid-case and the end portion of the cap, and a sealing portion formed to be in contact with the cartridge and the packing portion to prevent the fluid in the mid-case from flowing to the cap side.

In the fuel cell humidifier according to one embodiment of the present disclosure, the body member may include a lower body member formed to protrude the mid-case side and an upper body member formed in a flat surface shape toward the cap side.

In the fuel cell humidifier according to one embodiment of the present disclosure, the sealing portion may be formed to be in contact with the end portion of the cartridge and the lower body member at the same time.

In the fuel cell humidifier according to one embodiment of the present disclosure, the sealing portion may be formed to be in contact with the end portion of the cartridge and the upper body member at the same time.

In the fuel cell humidifier according to one embodiment of the present disclosure, the sealing portion may be formed to be in contact with the end portion of the cartridge and the protruding member at the same time.

In the fuel cell humidifier according to one embodiment of the present disclosure, the sealing portion may be formed to be in contact with at least one of the lower body member, the upper body member, and the protruding member, and the end portion of the cartridge at the same time.

In the fuel cell humidifier according to one embodiment of the present disclosure, the body member may include two or more holes into which two or more cartridges are inserted, two or more protruding members may be provided and formed to be in contact with end portions of the two or more cartridges, and two or more sealing portions may be provided and formed to be in contact with each of the two or more cartridges and the packing portion.

In the fuel cell humidifier according to one embodiment of the present disclosure, the protruding member may be in contact with the end portion of the cartridge while pressing the end portion of the cartridge by an elastic force to airtightly seal a space on the mid-case side and a space on the cap side.

In the fuel cell humidifier according to one embodiment of the present disclosure, the edge portion may include edge wings protruding in both directions, and the edge wing may be disposed to fill a groove formed at an end portion of the mid-case and seals an inside and an outside of the mid-case, the mid-case, and the cap.

In the fuel cell humidifier according to one embodiment of the present disclosure, each of the packing portion and the edge portion may have a first hardness of 20 to 70 Shore A, and a reinforcing member inserted into at least a portion of the packing portion and at least a portion of the edge portion and having a second hardness higher than the first hardness may further be provided.

In the fuel cell humidifier according to one embodiment of the present disclosure, the cartridge may include an inner case having an opening formed at an end portion and accommodating the plurality of hollow fiber membranes, and a potting portion to which the plurality of hollow fiber membranes are fixed and which closes the opening of the inner case.

In the fuel cell humidifier according to one embodiment of the present disclosure, at least a portion of the potting portion may be located outside the inner case, and the protruding member may be pressed against the potting portion and close contact with the potting portion.

In the fuel cell humidifier according to one embodiment of the present disclosure, the entire potting portion may be located inside the inner case, and the protruding member may be pressed against the inner case and close contact with the inner case.

Advantageous Effects

According to the present disclosure, since air leakage between the mid-case and the cap is prevented through mechanical assembly of the gasket assembly, a casting process (that is, a process of injecting and curing a liquid resin into a mold) and an additional sealing process (that is, a process of applying and curing a sealant) of the related art can be omitted. Therefore, according to the present disclosure, it is possible to significantly improve productivity by shortening a production process time of the fuel cell humidifier while preventing the air leakage between the mid-case and the cap.

In addition, since the gasket assembly of the present disclosure for preventing the air leakage between the mid-case and the cap is mounted on the humidification module 210 through mechanical assembly, when an abnormality occurs in a specific portion of the humidification module, the gasket assembly is simply separated mechanically, and then only the corresponding portion can be repaired or replaced. Therefore, according to the present disclosure, a maintenance cost of the fuel cell humidifier can be significantly reduced.

DESCRIPTION OF EXEMPLARY EMBODIMENTS

Since the present disclosure can have various modifications and can include various embodiments, specific embodiments are illustrated and described in detail in the detailed description. However, this is not intended to limit the present disclosure to specific embodiments, and it should be understood to include all modifications, equivalents, and substitutes included in a spirit and scope of the present disclosure.

The terms used in the present disclosure are only used to describe specific embodiments, and are not intended to limit the present disclosure. The singular expression includes the plural expression unless the context clearly dictates otherwise. In the present disclosure, terms such as "comprise" or "have" are intended to designate that the features, numbers, steps, operations, components, parts, or combinations thereof described in the specification exist, and it is to be understood that the terms do not preclude possibilities of presences or additions of one or more other features, numbers, steps, operations, components, parts, or combinations thereof. Hereinafter, a gasket assembly and a fuel cell humidifier including the same according to embodiments of the present disclosure will be described with reference to the drawings.

Figure 1:
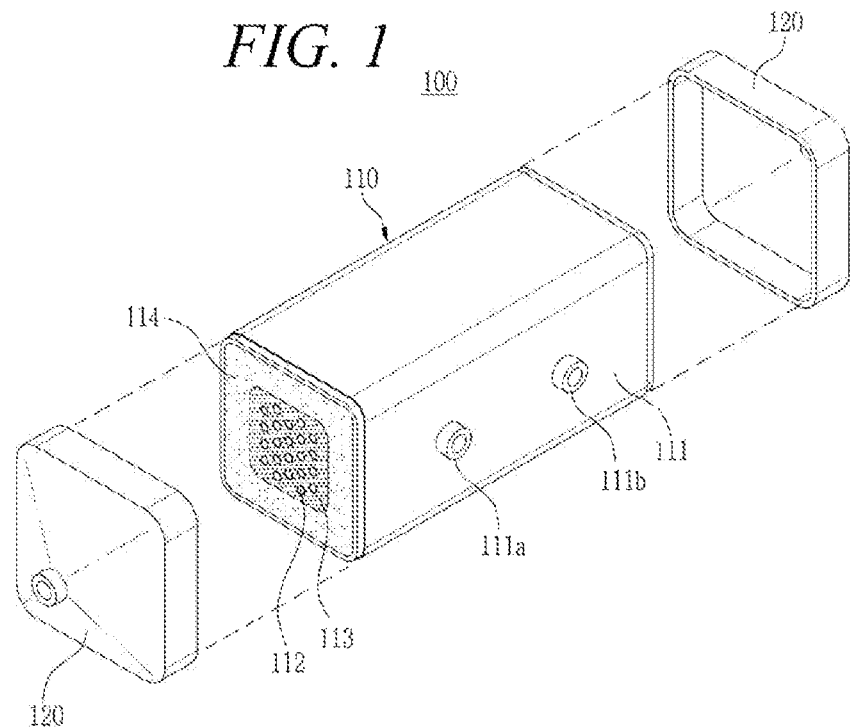
FIG. 1 is an exploded perspective view illustrating a fuel cell humidifier according to the related art.
Figure 2:
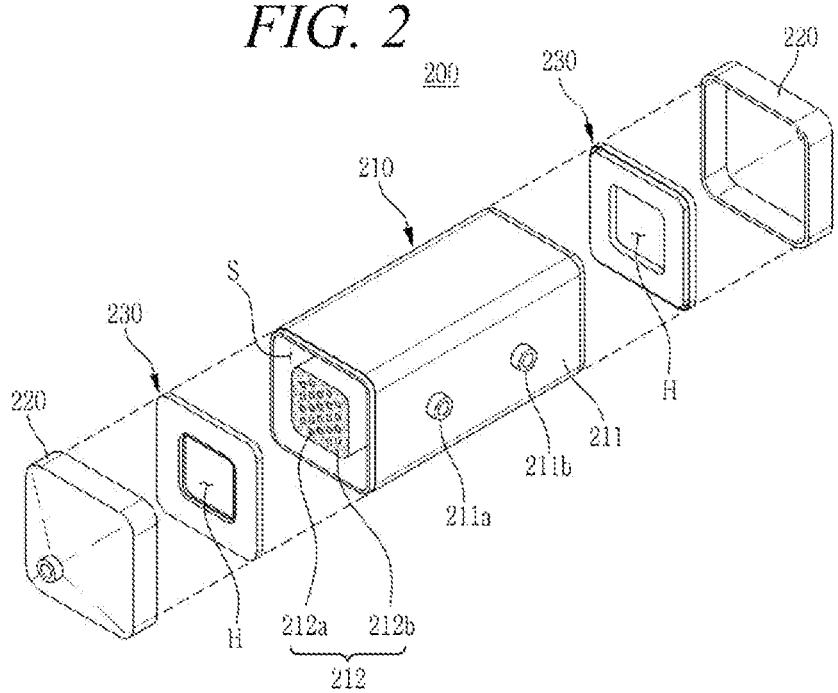
FIG. 2 is an exploded perspective view illustrating a fuel cell humidifier including a gasket assembly according to a first embodiment of the present disclosure.
Figure 3:
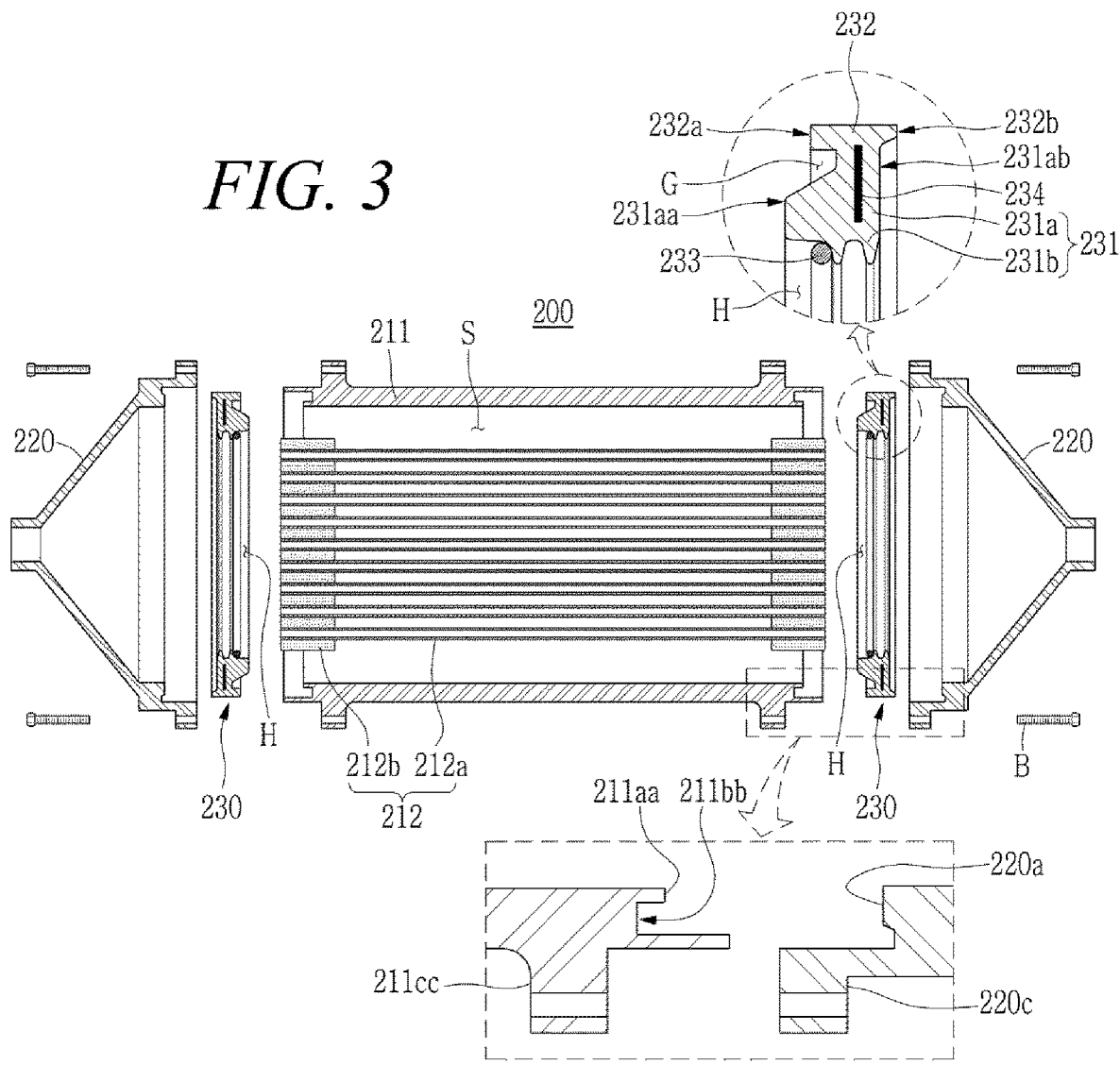
FIG. 3 is an exploded cross-sectional view illustrating the fuel cell humidifier including the gasket assembly according to the first embodiment of the present disclosure.
Figure 4:
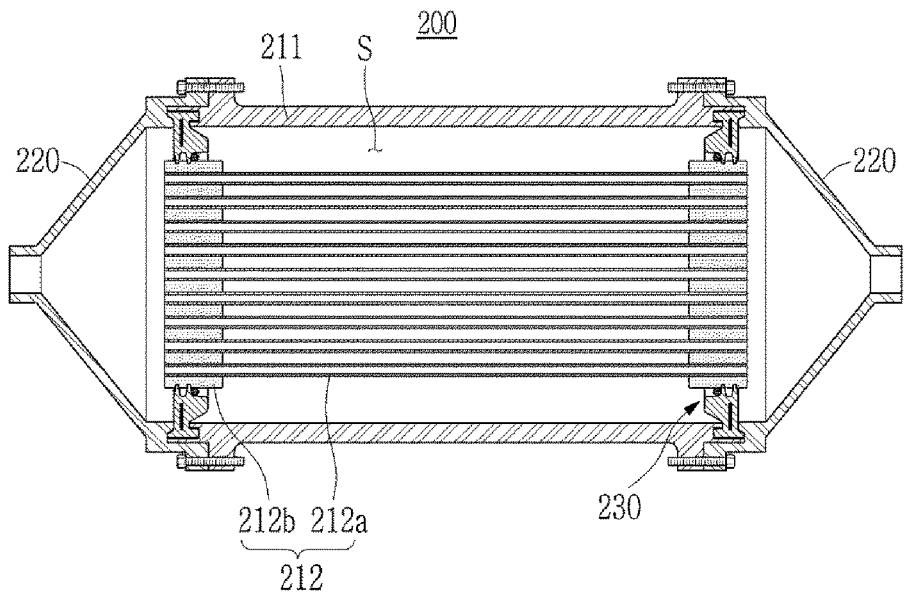
FIG. 4 is a cross-sectional view illustrating the fuel cell humidifier including the gasket assembly according to the first embodiment of the present disclosure.

FIG. 2 is an exploded perspective view illustrating a fuel cell humidifier including a gasket assembly according to a first embodiment of the present disclosure, FIG. 3 is an exploded cross-sectional view illustrating the fuel cell humidifier including the gasket assembly according to the first embodiment of the present disclosure, and FIG. 4 is a cross-sectional view illustrating the fuel cell humidifier including the gasket assembly according to the first embodiment of the present disclosure.

Referring to FIG. 2, a fuel cell humidifier 200 according to an embodiment of the present disclosure includes a humidification module 210 for humidifying air supplied from the outside with moisture in an off-gas discharged from the fuel cell stack. Each of both ends of the humidification module 210 is coupled to a cap 220.

One of the caps 220 supplies air supplied from the outside to the humidification module 210, and the other supplies air humidified by the humidification module 210 to the fuel cell stack.

The humidification module 210 is a device in which moisture exchange occurs between the air supplied from the outside and the off-gas, and may include a mid-case 211 having an off-gas inlet 211a and an off-gas outlet 211b and at least one cartridge 212 which is disposed in the mid-case 211.

The mid-case 211 and the cap 220 may each independently be formed of a rigid plastic or metal, and may have a circular or polygonal cross-section in a width direction. A circle includes an ellipse, and a polygon includes a polygon with rounded corners. For example, the rigid plastic may be polycarbonate, polyamide (PA), polyphthalamide (PPA), polypropylene (PP), or the like.

The cartridge 212 may include a plurality of hollow fiber membranes 212a and a potting portion 212b for fixing the hollow fiber membranes 212a to each other. For example, ends of the hollow fiber membranes 212a may be fixed to the potting portion 212b.

Each of the hollow fiber membranes 212a may include polysulfone resin, polyethersulfone resin, sulfonated polysulfone resin, polyvinylidene fluoride (PVDF) resin, polyacrylonitrile (PAN) resin, polyimide resin, polyamideimide resin, a polyester imide resin, or a polymer film formed of a mixture of at least two or more thereof, and the potting portion 212b may be formed by curing a liquid resin such as a liquid polyurethane resin through a casting method such as deep potting or centrifugal potting.

Air supplied from the outside flows along hollows of the hollow fiber membranes (212a). The off-gas introduced into the mid-case 211 through the off-gas inlet 211a comes into contact with outer surfaces of the hollow fiber membranes 212a and then is discharged from the mid-case 211 through the off-gas outlet 211b. When the off-gas comes into contact with the outer surfaces of the hollow fiber membranes 212a, moisture contained in the off-gas penetrates the hollow fiber membranes 212a to humidify the air flowing along the hollows of the hollow fiber membranes 212a.

The cap 220 is only in fluid communication with the hollows of the hollow fiber membranes 212a, and should be completely blocked from an inner space S of the mid-case 211. Otherwise, air leakage occurs due to the pressure difference, and thus, an amount of humidified air supplied to the fuel cell stack is reduced and power generation efficiency of the fuel cell is reduced.

To solve this problem, the fuel cell humidifier 200 of the present disclosure further includes a gasket assembly 230 which is airtightly coupled to each end of the humidification module 210 through mechanical assembly.

According to the present disclosure, since air leakage between the mid-case 211 and the cap 220 is prevented through the mechanical assembly of the gasket assembly 230, a casting process (that is, a process of injecting and curing a liquid resin into a mold) and an additional sealing process (that is, a process of applying and curing a sealant) of the related art may be omitted. Therefore, according to the present disclosure, it is possible to significantly improve productivity by shortening a production process time of the fuel cell humidifier 200 while preventing air leakage between the mid-case 211 and the cap 220.

In addition, since the gasket assembly 230 of the present disclosure for preventing the air leakage between the mid-case 211 and the cap 220 is mounted on the humidification module 210 through mechanical assembly, when an abnormality occurs in a specific portion (for example, cartridge 212) of the humidification module 210, the gasket assembly 230 is mechanically separated from the humidification module 210, and then only the corresponding portion can be repaired or replaced. Therefore, according to the present disclosure, a maintenance cost of the fuel cell humidifier 200 can be significantly reduced.

Referring to FIGS. 3 and 4, the gasket assembly 230 according to the first embodiment of the present disclosure includes a packing portion 231, an edge portion 232, and a sealing portion 233. Each of the packing portion 231 and the edge portion 232 may be formed of an elastic material (for example, silicone, rubber, or the like)) having a first hardness of 20 to 70 Shore A, preferably 30 to 60 Shore A. The sealing portion 233 may include at least one of a solid sealing material and a liquid sealing material. The solid sealing material may be made of a material such as silicone, acrylic rubber, EPDM, or NBR, and the liquid sealing material may be made of a material such as silicone or urethane.

The packing portion 231 has a hole H into which the end (for example, the potting portion 212b) of the cartridge 212 is inserted, and is interposed between the mid-case 211 and the cartridge 212. The packing portion 231 includes a body member 231a and a protruding member 231b.

The body member 231a has the hole H into which the end (for example, the potting portion 212b) of the cartridge 212 is inserted, and the hole H has a shape corresponding to a shape of the end of the cartridge 212. A lower body member 231aa protruding from the body member 231a toward the mid-case 211 may have a polygonal cross-section (for example, a trapezoidal shape), and an upper body member 231ab formed toward the cap 220 may be formed in a planar shape. A space in which the sealing portion 233 is disposed is formed between the lower body member 231aa and the cartridge potting portion 212b. Moreover, a groove G into which the end 211aa of the mid-case 211 is fitted is formed between the lower body member 231aa and the edge portion 232.

The protruding member 231b is formed at one end of the body member 231a to be in contact with the cartridge potting portion 212b inserted into the hole H. The protruding member 231b may be at least one annular protrusion protruding from one end of the body member 231a. The protruding member 231b may be in contact with the cartridge potting portion 212b while pressing the cartridge potting portion 212b by an elastic force to airtightly seal the space of the mid-case 211 and the space by the cap 220. Accordingly, the protruding member 231b may prevent a fluid in the mid-case 211 from flowing into the space formed on the cap 220 side. In addition, since the protruding member 231b has elasticity, the protruding member 231b can perform a vibration-absorbing function, and thus, it is possible to prevent damage due to vibrations of the humidifier 200.

The edge portion 232 is formed at the other end of the body member 231a. The edge portion 232 may be interposed in a space formed by the groove 211bb formed at the end of the mid-case and an end 220a of the cap. The edge portion 232 may include edge wings 232a and 232b protruding in both directions. The edge wings 232a and 232b may be formed in a longitudinal direction of the humidification module 210. At the time of assembling, the edge wings 232a and 232b are inserted into the grooves 211bb of the mid-case end, and the end portion 220a of the cap presses the edge wing 232b and then fastened and assembled by fastening means such as bolts B. In this case, since the edge wings 232a and 232b are made of an elastic material, the edge wings 232a and 232b may be interposed while filling a certain portion of the space of the groove 211bb at the end of the mid-case. Fastening fragments 211cc and 220c having fastening holes for fastening bolts may be formed on the end side surfaces of the mid-case 211 and the cap 220. The edge wings 232a and 232b may seal the inside and outside of the mid-case 211 and the mid-case 211 and the cap 220 by airtightly sealing the groove 211bb of the end portion of the mid-case.

The sealing portion 233 is formed to be in contact with the cartridge 212 and the packing portion 231 between the cartridge 212 and the packing portion 231. Specifically, the sealing portion 233 is formed to be in contact with (or adhere) the potting portion 212b of the cartridge and the lower body member 231aa of the packing portion at the same time. The sealing portion 233 airtightly seals the space of the mid-case 211 and the space of the cap 220 to prevent the fluid in the mid-case 211 from flowing toward the cap 220.

In addition, the gasket assembly 230 may further include a reinforcing member 234. The reinforcing member 234 may have a second hardness higher than the first hardness. For example, the reinforcing member 234 may be formed of a metal, a thermoplastic resin, or a thermosetting resin. The reinforcing member 234 may be formed by being inserted into the gasket assembly 230 and formed by manufacturing the reinforcing member 234 after inserting the metal plate into the mold when the gasket assembly 230 is molded. The reinforcing member 234 may be formed by being inserted into at least a portion of the packing portion 231 and at least a portion of the edge portion 232. The reinforcing member 234 may be formed in a portion (a portion in which the groove G is formed) vulnerable to deformation in the gasket assembly 230. The reinforcing member 234 having a higher hardness than those of the packing portion 231 and the edge portion 232 prevents the deformation of the body member 231a when the gasket assembly 230 is mechanically assembled to the humidification module 210 or when the humidifier is operated, and thus, it is possible to more reliably prevent the air leakage.

Figure 5:
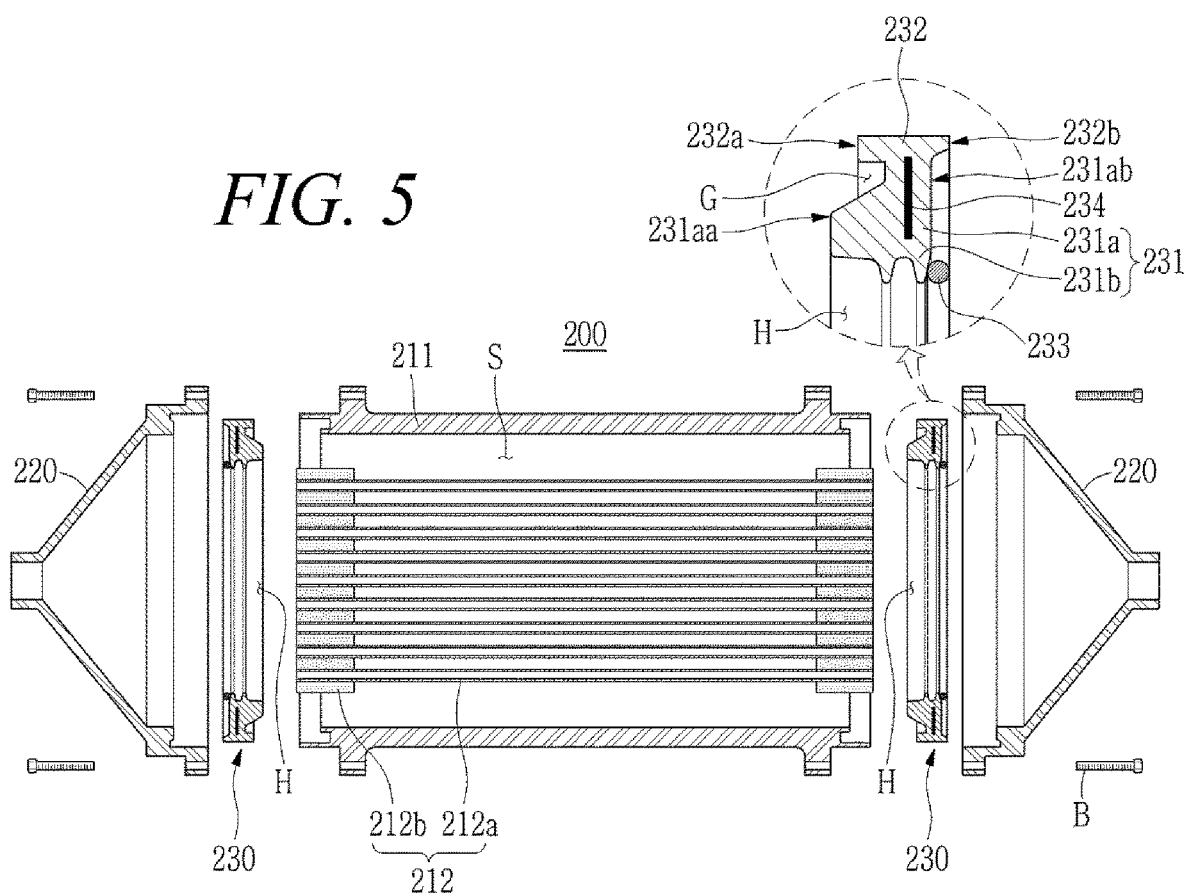
FIG. 5 is an exploded cross-sectional view illustrating a fuel cell humidifier including a gasket assembly according to a second embodiment of the present disclosure.

Next, gasket assemblies according to various embodiments of the present disclosure will be described with reference to FIGS. 5 to 7d. FIG. 5 is an exploded cross-sectional view illustrating a fuel cell humidifier including a gasket assembly according to a second embodiment of the present disclosure, FIG. 6 is an exploded cross-sectional view illustrating a fuel cell humidifier including a gasket assembly according to a third embodiment of the present disclosure, and FIGS. 7a to 7d are cross-sectional views illustrating various applications of the gasket assemblies according to embodiments of the present disclosure.

Referring to FIGS. 5 to 7d, each of the gasket assemblies according to various embodiments of the present disclosure includes the packing portion 231, the edge portion 232, and the sealing portion 233. In embodiments of FIGS. 5 to 7d, only the position of the sealing portion 233 is different, and the rest of the configuration is substantially the same, and thus, repeated description will be omitted.

In the embodiment of FIG. 5, the sealing portion 233 is formed to be in contact with the potting portion 212b of the cartridge and the upper body member 231ab of the packing portion at the same time.

Figure 6:
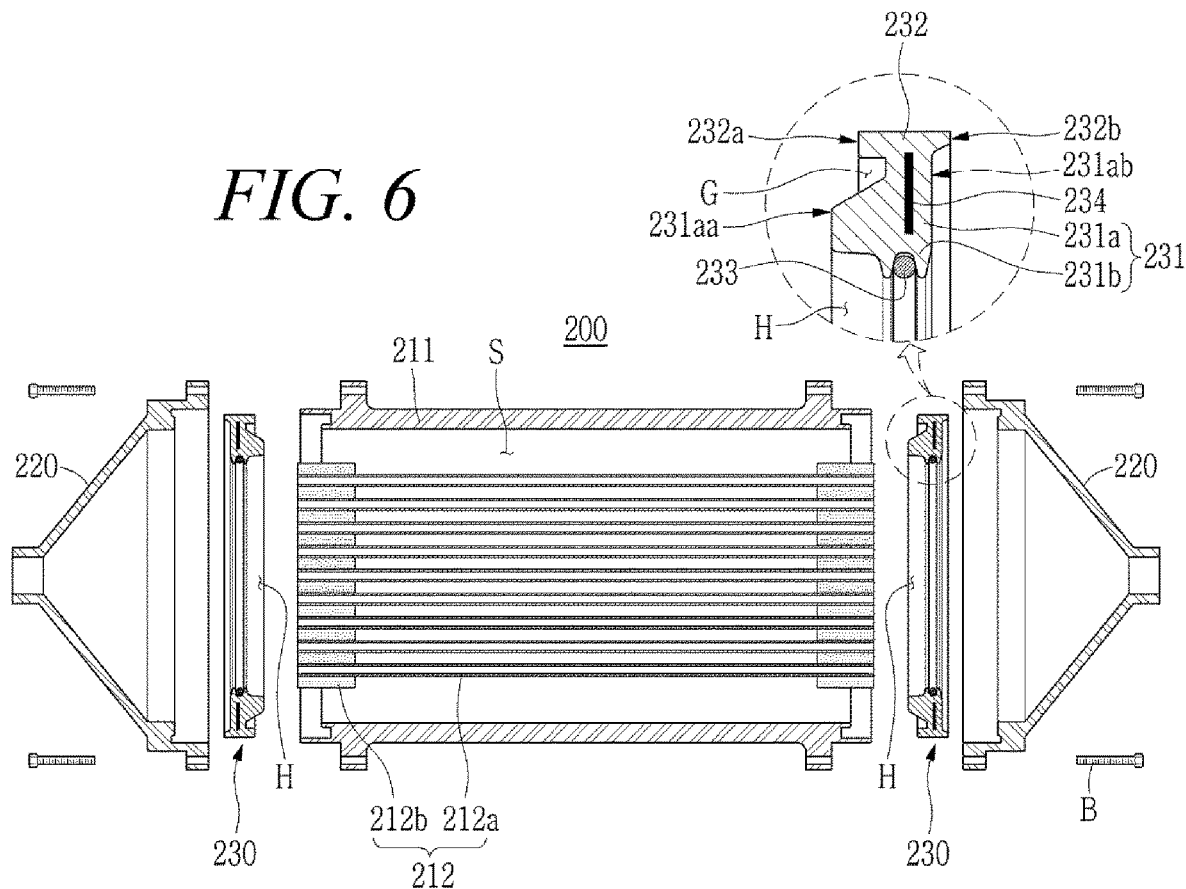
FIG. 6 is an exploded cross-sectional view illustrating a fuel cell humidifier including a gasket assembly according to a third embodiment of the present disclosure.
Figure 7A:
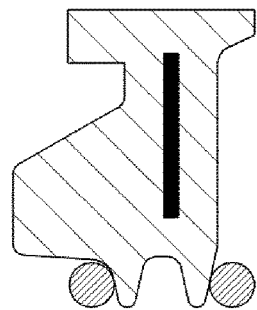
FIGS. 7a to 7d are cross-sectional views illustrating various applications of the gasket assemblies according to embodiments of the present disclosure.
Figure 7B:
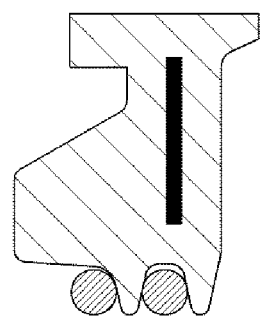
Figure 7C:
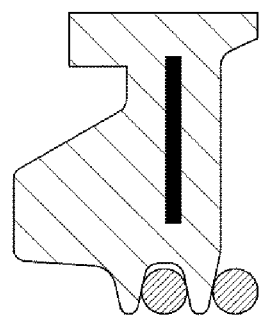
Figure 7D:
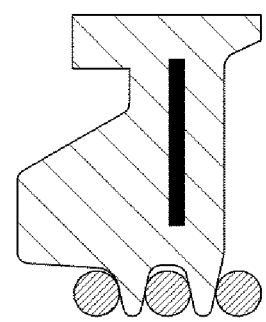

In the embodiment of FIG. 6, the sealing portion 233 is formed so as to be in contact with the potting portion 212b of the cartridge and the protruding member 231b of the packing portion at the same time. In this case, two or more protruding members 231b may be formed, and the sealing portion 233 is formed between two or more protruding members 231b.

FIGS. 7a to 7d illustrate that the sealing portion 233 is formed to be in contact with at least one of the lower body member 231aa, the upper body member 231ab, and the protruding member 231b of the packing portion.

In the above embodiments, the sealing portion 233 airtightly seals the space of the mid-case 211 and the space of the cap 220 to prevent the fluid in the mid-case 211 from flowing to the cap 220 side, and thus, each area in which the sealing portion 233 is formed may implement a first sealing area.

In addition, in the above embodiments, the protruding member 231b is in contact the cartridge potting portion 212b while pressing the cartridge potting portion 212b to airtightly seal the space of the mid-case 211 and the space by the cap 220, and thus, an area in which the protruding member 231b is formed may implement a second sealing area.

In addition, in the above embodiments, the edge wings 232a and 232b airtightly seal the groove 211bb of the mid-case end portion to seal the inside and outside of the mid-case 211, and the mid-case 211 and the cap 220, an area in which the edge wings 232a and 232b are formed may implement a third sealing area.

As described above, in the embodiments, since the sealing area is formed in a double triple, it is possible to reliably prevent air leakage between the mid-case 211 and the cap 220.

Figure 8:
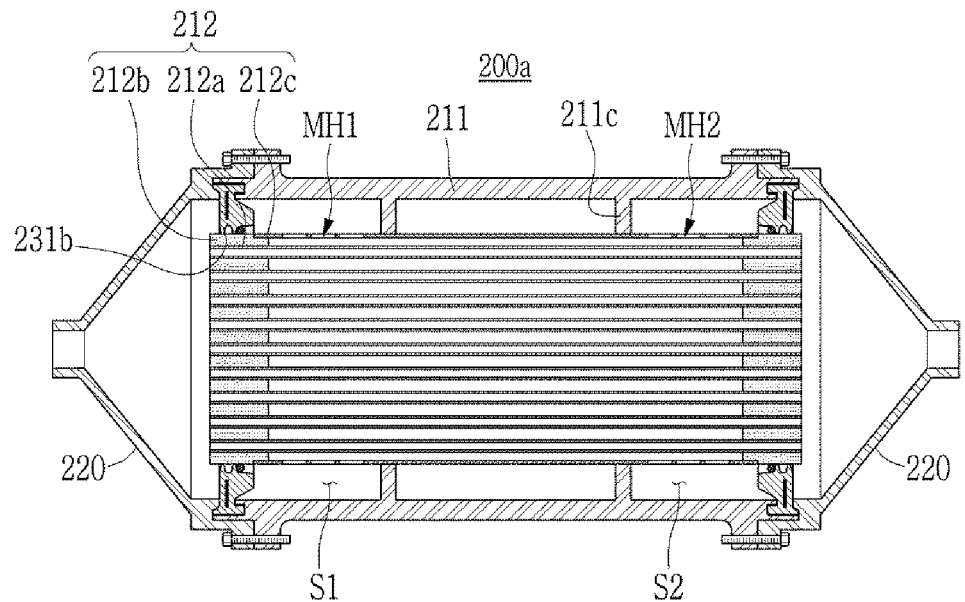
FIG. 8 is a cross-sectional view illustrating a second embodiment of the fuel cell humidifier including the gasket assembly according to the first embodiment of the present disclosure.

Next, a second embodiment of the fuel cell humidifier including the gasket assembly according to the first embodiment of the present disclosure will be described with reference to FIG. 8. FIG. 8 is a cross-sectional view illustrating the second embodiment of the fuel cell humidifier including the gasket assembly according to the first embodiment of the present disclosure.

As illustrated in FIG. 8, in a fuel cell humidifier 200a according to the second embodiment of the present disclosure, except that (i) the inner space of the mid-case 211 is divided into a first space S1 and a second space 2 by partitions 211c and (ii) the cartridge 212 further includes an inner case 212c, the fuel cell humidifier 200a is substantially the same as the fuel cell humidifier 200.

The inner case 212c has an opening at each end and the hollow fiber membranes 212a are contained inside the inner case 212c. The potting portion 212b in which the end portions of the hollow fiber membranes 212a are potted closes the opening of the inner case 212c.

As illustrated in FIG. 8, at least a portion of the potting portion 212b may be located outside the inner case 212c, and the protruding member 231b of the gasket assembly 230 may be in close contact with the potting portion 212b.

The inner case 212c includes a plurality of holes (hereinafter, "first mesh holes") MH1 arranged in a mesh shape for fluid communication with the first space s1 and a plurality of holes (hereinafter, "second mesh holes") arranged in a mesh shape for fluid communication with the second space S2.

The off-gas introduced into the first space S1 of the mid-case 211 through the off-gas inlet 211a flows into the inner case 212c through the first mesh holes MH1, and comes into contact with the outer surfaces of the hollow fiber membranes 212a. Subsequently, the off-gas deprived of moisture is introduced into the second space S2 through the second mesh holes MH2 and then discharged from the mid-case 211 through the off-gas outlet 211b.

In the cartridge 212 including the inner case 212c, it is possible to easily assemble to the mid-case 211 and easily replace the mid-case 211.

Figure 9:
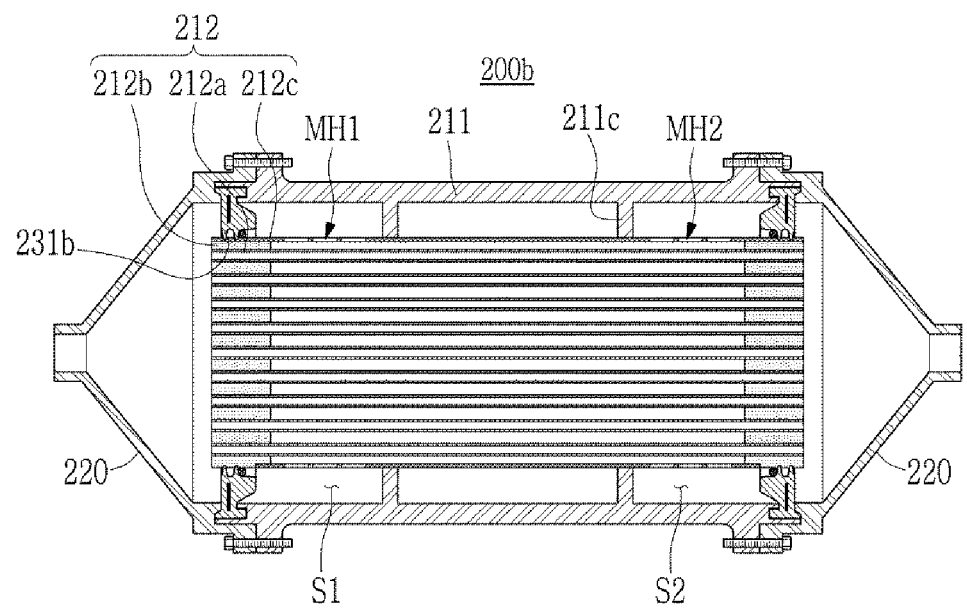
FIG. 9 is a cross-sectional view illustrating a third embodiment of the fuel cell humidifier including the gasket assembly according to the first embodiment of the present disclosure.

Next, a third embodiment of the fuel cell humidifier including the gasket assembly according to the first embodiment of the present disclosure will be described with reference to FIG. 9. FIG. 9 is a cross-sectional view illustrating the third embodiment of the fuel cell humidifier including the gasket assembly according to the first embodiment of the present disclosure.

As illustrated in FIG. 9, in a fuel cell humidifier 200b according to the third embodiment of the present disclosure, except that the entire potting portion 212b is located in the inner case 212c and the protruding member 231b of the gasket assembly 230 is in close contact with the inner case 212c rather than the potting portion 212b, the fuel cell humidifier 200b is substantially the same as the fuel cell humidifier 200a according to the second embodiment described above.

FIGS. 4, 8, and 9 illustrate the fuel cell humidifiers 200, 200a, and 200b including the gasket assembly according to the first embodiment, but the embodiments of the present disclosure are not limited thereto, and the gasket assemblies according to various embodiments of FIGS. 5 to 7 may be applied to the fuel cell humidifier of the first to third embodiments.

Figure 10:
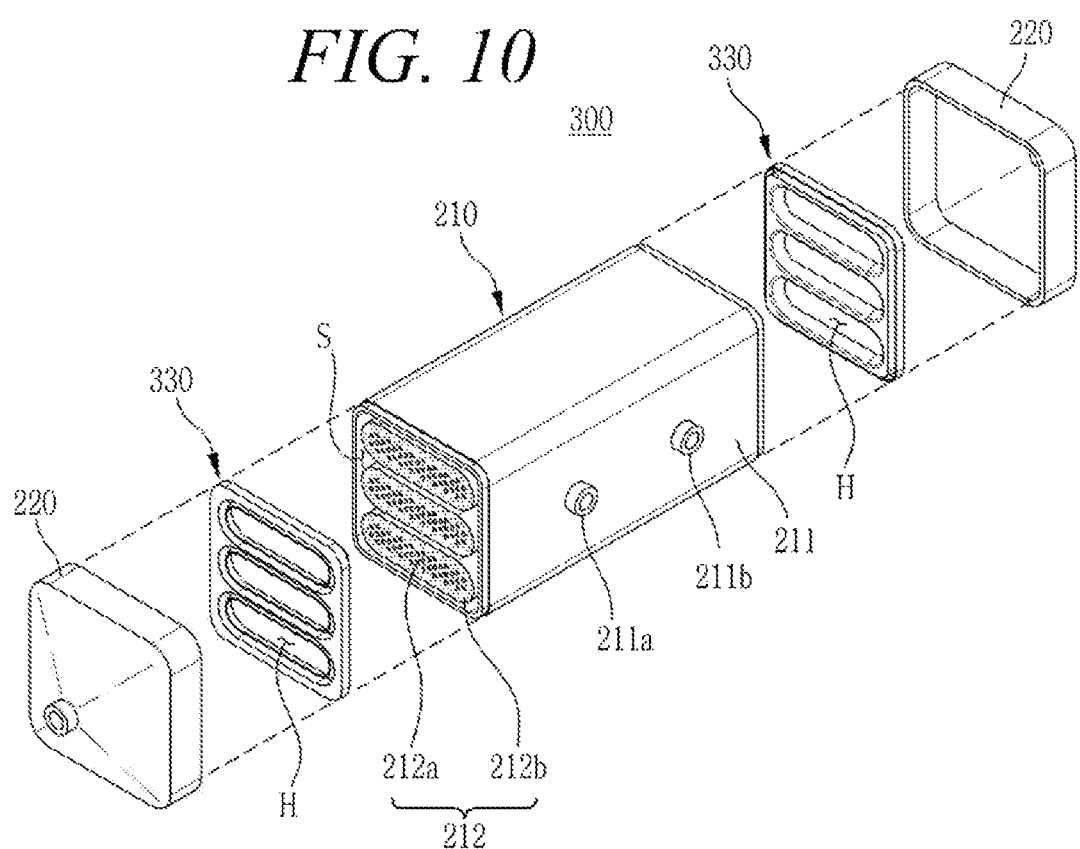
FIG. 10 is an exploded perspective view illustrating a fourth embodiment of a fuel cell humidifier including a gasket assembly according to a fourth embodiment of the present disclosure.

Next, a fourth embodiment of a fuel cell humidifier including a gasket assembly according to a fourth embodiment of the present disclosure will be described with reference to FIGS. 10 to 12. FIG. 10 is an exploded perspective view illustrating the fourth embodiment of the fuel cell humidifier including the gasket assembly according to the fourth embodiment of the present disclosure, FIG. 11 is an exploded cross-sectional view illustrating the fourth embodiment of the fuel cell humidifier including the gasket assembly according to the fourth embodiment of the present disclosure, and FIG. 12 is a cross-sectional view illustrating the fourth embodiment of the fuel cell humidifier including the gasket assembly according to the fourth embodiment of the present disclosure.

Figure 11:
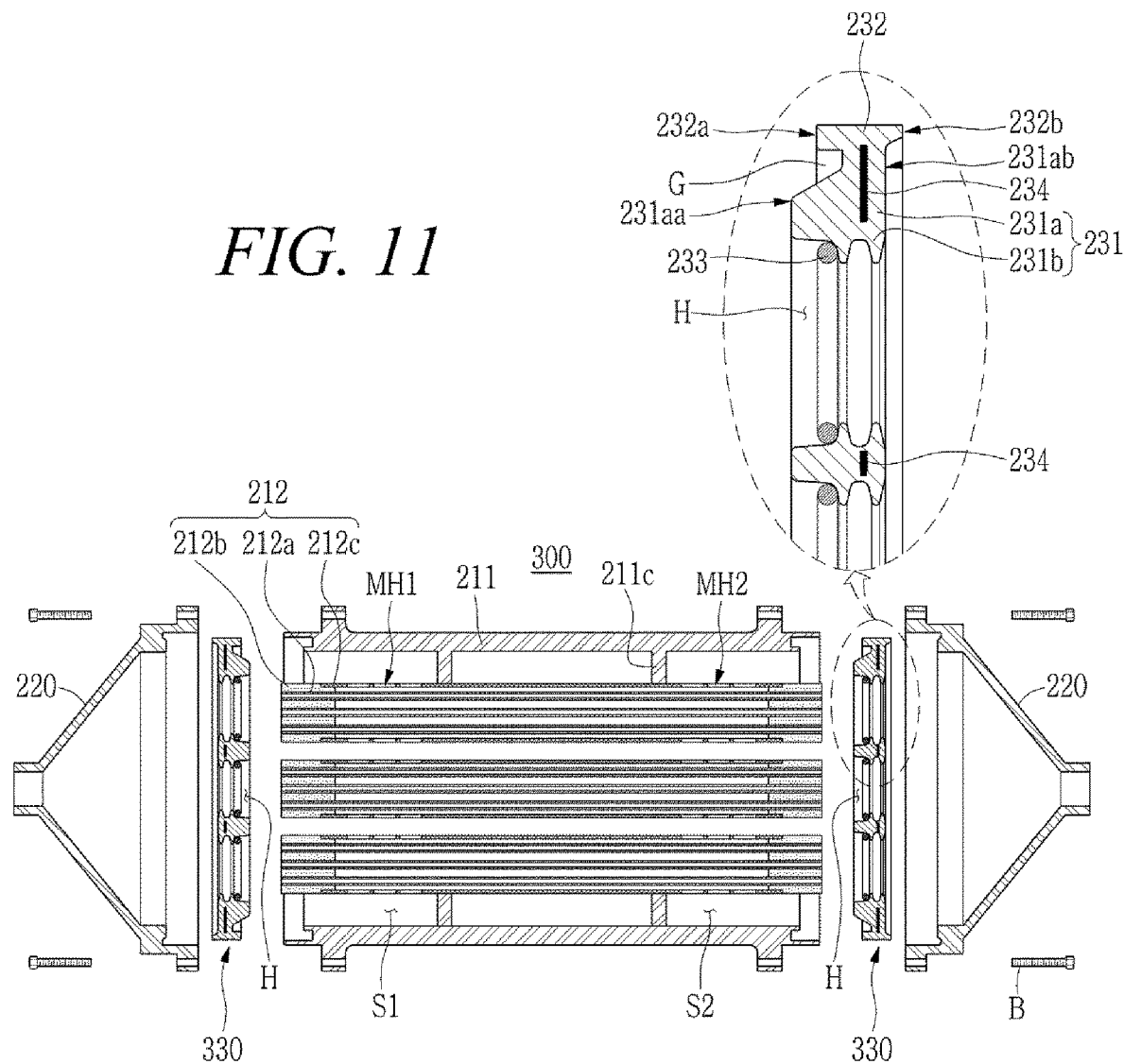
FIG. 11 is an exploded cross-sectional view illustrating the fourth embodiment of the fuel cell humidifier including the gasket assembly according to the fourth embodiment of the present disclosure.
Figure 12:
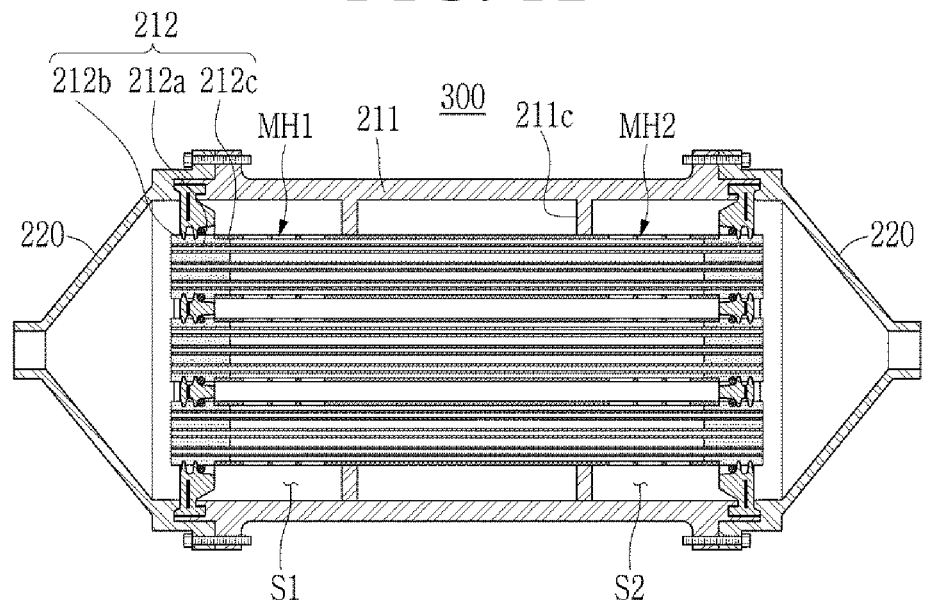
FIG. 12 is a cross-sectional view illustrating the fourth embodiment of the fuel cell humidifier including the gasket assembly according to the fourth embodiment of the present disclosure.

Referring to FIGS. 10 to 12, in a fuel cell humidifier 300 according to the fourth embodiment to which a gasket assembly 330 according to the fourth embodiment of the present disclosure is applied, except that (i) the humidification module 210 includes two or more cartridges 212, (ii) the body member 231a of the packing portion 231 includes two or more holes H into which the cartridges 212 are inserted, (iii) two or more protruding members 231b formed at one end of the body member 231a to be in contact with the cartridge potting portion 212b are provided, and (iv) two or more sealing portions 233 formed to be in contact with the cartridge 212 and the packing portion 231 between the cartridge 212 and the packing portion 231 are provided, the fuel cell humidifier 300 is substantially the same as the fuel cell humidifier 200a according to the second embodiment described above.

The plurality of cartridges 212 each including the inner case 212c are mounted in the mid-case 211 at regular intervals. Accordingly, the off-gas is uniformly distributed to all the hollow fiber membranes 212a present in the mid-case 211, and only a specific cartridge 212 in which a problem occurs can be selectively replaced so that the maintenance cost of the fuel cell humidifier 300 can be further reduced.

Figure 13:
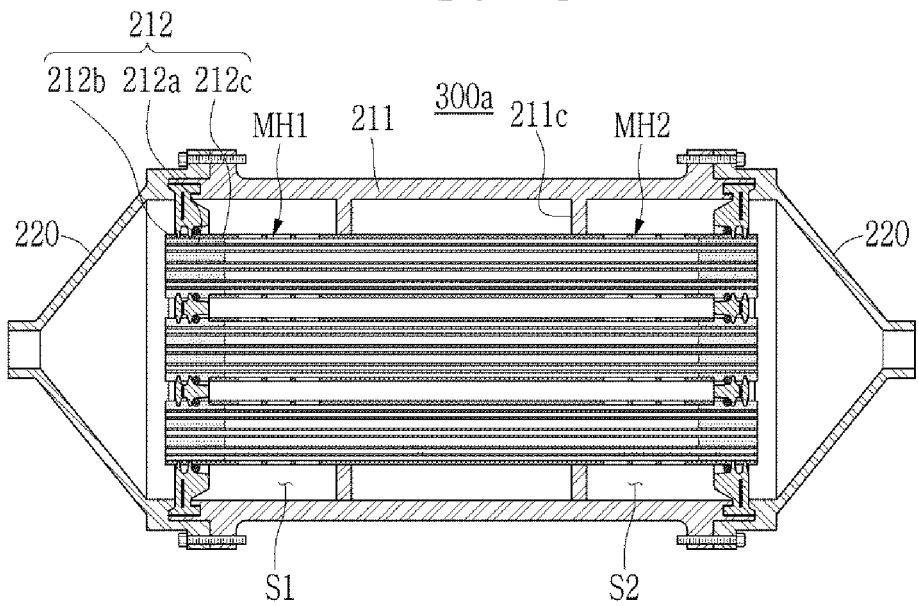
FIG. 13 is a cross-sectional view illustrating a fifth embodiment of the fuel cell humidifier including the gasket assembly according to the fourth embodiment of the present disclosure.

FIG. 13 schematically illustrates a cross-sectional view of the fuel cell humidifier 300a according to the fifth embodiment of the fuel cell humidifier to which the gasket assembly 330 according to the fourth embodiment of the present disclosure is applied.

As illustrated in FIG. 13, in the fuel cell humidifier 300a according to the fifth embodiment of the present disclosure, except that the entire potting portion 212b of each cartridge 212 is located in the corresponding inner case 212c and the protruding members 231b of the gasket assembly 330 are in close contact with the inner cases 212c rather than the potting portions 212b, the fuel cell humidifier 300a is substantially the same as the fuel cell humidifier 300 according to the above-described fourth embodiment.

Hereinbefore, embodiments of the present disclosure are described, but those of ordinary skill in the art can variously modify and change the present disclosure through addition, modification, deletion of components within a scope that does not depart from a spirit of the present disclosure described in claims, and these will also be included within the scope of the present disclosure.

| [Detailed Description of Main Elements] | |
|---|---|
| 10, 200, 200a, 200b, 300, 300a: fuel cell humidifier | |
| 210: humidification module | 211: mid-case |
| 211a: off-gas inlet | 211b: off-gas outlet |
| 211c: partition | 212: cartridge |
| 212a: hollow fiber membrane | 212b: potting portion |
| 212c: inner case | 220: cap |
| 230, 330: gasket assembly | |
| 231: packing portion | 231a: body member |
| 231b: protruding member | 232: edge portion |
| 233: sealing portion | 234: reinforcing member |

What is claimed is:

1. A gasket assembly for a fuel cell humidifier including a mid-case, a cap fastened to the mid-case, and at least one cartridge disposed in the mid-case and accommodating a plurality of hollow fiber membranes, the gasket assembly comprising:
a packing portion including a body member having a hole into which an end portion of the cartridge is inserted and a protruding member formed at one end of the body member and in contact with the end portion of the cartridge inserted into the hole to prevent a fluid in the mid-case from flowing to the cap side;
an edge portion formed at the other end of the body member and formed in a space formed by a groove formed in the end portion of the mid-case and the end portion of the cap; and
a sealing portion formed to be in contact with the cartridge and the packing portion to prevent the fluid in the mid-case from flowing to the cap side.

2. The gasket assembly of claim 1, wherein the body member includes a lower body member formed to protrude the mid-case side and an upper body member formed in a flat surface shape toward the cap side.

3. The gasket assembly of claim 2, wherein the sealing portion is formed to be in contact with the end portion of the cartridge and the lower body member at the same time.

4. The gasket assembly of claim 2, wherein the sealing portion is formed to be in contact with the end portion of the cartridge and the upper body member at the same time.

5. The gasket assembly of claim 2, wherein the sealing portion is formed to be in contact with the end portion of the cartridge and the protruding member at the same time.

6. The gasket assembly of claim 2, wherein the sealing portion is formed to be in contact with at least one of the lower body member, the upper body member, and the protruding member, and the end portion of the cartridge at the same time.

7. The gasket assembly of claim 1, wherein the body member includes two or more holes into which two or more cartridges are inserted,
two or more protruding members are provided and formed to be in contact with end portions of the two or more cartridges, and
two or more sealing portions are provided and formed to be in contact with each of the two or more cartridges and the packing portion.

8. The gasket assembly of claim 1, wherein the protruding member is in contact with the end portion of the cartridge while pressing the end portion of the cartridge by an elastic force to airtightly seal a space on the mid-case side and a space on the cap side.

9. The gasket assembly of claim 1, wherein the edge portion includes edge wings protruding in both directions, and the edge wing is disposed to fill a groove formed at an end portion of the mid-case and seals an inside and an outside of the mid-case, the mid-case, and the cap.

10. The gasket assembly of claim 1, wherein each of the packing portion and the edge portion has a first hardness of 20 to 70 Shore A, and
a reinforcing member inserted into at least a portion of the packing portion and at least a portion of the edge portion and having a second hardness higher than the first hardness is further provided.

11. A fuel cell humidifier comprising:
a mid-case;
a cap fastened to the mid-case;
at least one cartridge disposed in the mid-case and accommodating a plurality of hollow first membranes; and
a gasket assembly airtightly coupled to at least one end of a humidification module through mechanical assembly so that the cap is in fluid communication with only the hollow fiber membranes,
the gasket assembly includes
a packing portion including a body member having a hole into which an end portion of the cartridge is inserted and a protruding member formed at one end of the body member and in contact with the end portion of the cartridge inserted into the hole to prevent a fluid in the mid-case from flowing to the cap side,
an edge portion formed at the other end of the body member and formed in a space formed by a groove formed in the end portion of the mid-case and the end portion of the cap, and
a sealing portion formed to be in contact with the cartridge and the packing portion to prevent the fluid in the mid-case from flowing to the cap side.

12. The fuel cell humidifier of claim 11, wherein the body member includes a lower body member formed to protrude the mid-case side and an upper body member formed in a flat surface shape toward the cap side.

13. The fuel cell humidifier of claim 12, wherein the sealing portion is formed to be in contact with the end portion of the cartridge and the lower body member at the same time.

14. The fuel cell humidifier of claim 12, wherein the sealing portion is formed to be in contact with the end portion of the cartridge and the upper body member at the same time.

15. The fuel cell humidifier of claim 12, wherein the sealing portion is formed to be in contact with the end portion of the cartridge and the protruding member at the same time.

16. The fuel cell humidifier of claim 12, the sealing portion is formed to be in contact with at least one of the lower body member, the upper body member, and the protruding member, and the end portion of the cartridge at the same time.

17. The fuel cell humidifier of claim 11, wherein the body member includes two or more holes into which two or more cartridges are inserted,
two or more protruding members are provided and formed to be in contact with end portions of the two or more cartridges, and
two or more sealing portions are provided and formed to be in contact with each of the two or more cartridges and the packing portion.

18. The fuel cell humidifier of claim 11, wherein the protruding member is in contact with the end portion of the cartridge while pressing the end portion of the cartridge by an elastic force to airtightly seal a space on the mid-case side and a space on the cap side.

19. The fuel cell humidifier of claim 11, wherein the edge portion includes edge wings protruding in both directions, and the edge wing is disposed to fill a groove formed at an end portion of the mid-case and seals an inside and an outside of the mid-case, the mid-case, and the cap.

20. The fuel cell humidifier of claim 11, wherein each of the packing portion and the edge portion has a first hardness of 20 to 70 Shore A, and a reinforcing member inserted into at least a portion of the packing portion and at least a portion of the edge portion and having a second hardness higher than the first hardness is further provided.

* * * * *